United States Patent [19]
Huignard

[11] Patent Number: 4,458,981
[45] Date of Patent: Jul. 10, 1984

[54] HOLOGRAPHIC MOVIE DEVICE
[75] Inventor: Jean-Pierre Huignard, Paris, France
[73] Assignee: Thomson-CSF, Paris, France
[21] Appl. No.: 424,764
[22] Filed: Sep. 27, 1982
[30] Foreign Application Priority Data
  Jan. 26, 1982 [FR] France ................ 82 01202
[51] Int. Cl.³ ............................................. G03H 1/02
[52] U.S. Cl. ............................................... 350/3.79
[58] Field of Search ........................... 350/3.79, 3.6
[56] References Cited
  U.S. PATENT DOCUMENTS
  3,606,517  9/1971  Jacobson et al. ............ 350/3.79
  3,627,916 12/1971  Bestenreiner ................ 350/3.79
  3,752,556  8/1973  Kurtz ........................... 350/3.79
  3,888,561  6/1975  Kurtz ........................... 350/3.79

Primary Examiner—Bruce Y. Arnold
Attorney, Agent, or Firm—Oblon, Fisher, Spivak, McClelland & Maier

[57] ABSTRACT

A device is provided for recording and projecting holographic images.

A laser illuminates a scene to be filmed and provides the spherical reference wave for recording the hologram on the film. The wave front diffused by the scene is amplified in an induced refraction index medium which receives a flat reference wave, also supplied by the laser. The amplified wave front falls on the high resolution film and the hologram is recorded.

6 Claims, 4 Drawing Figures

FIG. 2 HOLOGRAPHIC RECORDING

HOLOGRAPHIC DISPLAY

HOLOGRAPHIC MOVIE DEVICE

BACKGROUND OF THE INVENTION

The subject of the present invention is a device for providing holographic movies or motion pictures and so obtaining for spectators the effect of relief.

It is known that if it is desired to record by means of holography objects having dimensions greater than 1 m, the amount of light diffused by this object and striking the sensitive surface is small. To form a hologram, which receives both this diffused light and a coherent reference wave, exposure times greater than a second must be used with lasers having a power of the order of a watt. This is due to the low sensitivity of the photographic support media of high resolution required for holographic recording. It is then not possible to record the 20 images per second required for the projection of movies.

It is further known, particularly from the article by J. P. Huignard and A. Marrakchi published in "Optics Communications", volume 38 (1981), page 249, to amplify a wavefront in photorefractive crystals such as $Bi_{12}SiO_{20}$ (B.S.O.), by mixing two waves.

The present invention, using optical amplification, allows a hologram to be obtained requiring an exposure time compatible with the cinema.

SUMMARY OF THE INVENTION

It is an object of this invention to provide a holographic motion picture device for recording successive holographic images of a scene on a photosensitive film and means for projecting holographic images, wherein the recording comprises at least one laser which illuminates the scene and which further supplies the spherical reference wave incident on the film. The wave diffused by the film is incident to the induced refraction index variation medium, which medium is further illuminated by a flat wave also obtained from the beam supplied by the laser. The wave front obtained from illuminating the scene is amplified in this medium, and the amplified wave front strikes the film.

BRIEF DESCRIPTION OF THE DRAWINGS

Other features and advantages of the invention will be clear from the following description, illustrated by the figures which show.

DESCRIPTION OF THE PREFERRED EMBODIMENT

Figure 1:
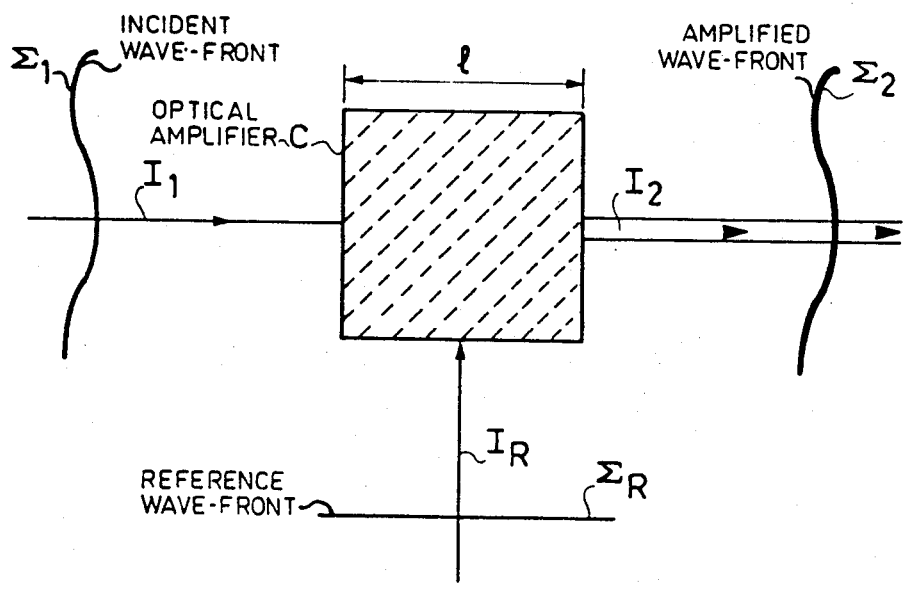
FIG. 1, the diagram of an amplification of a wave front.

FIG. 1 shows the known principle of amplifying a wave front $\Sigma_1$ by means of an induced refraction index variation medium C which is preferably a B.S.O. crystal.

To obtain the optical amplification, it is possible to use the following physical effects:
optical Kerr effect for example in $CS_2$,
saturated absorption in gases (Na vapor; $SF_6$...),
photorefractive effect: (BSO, $LiNBO_3$, $BaTiO_3$ etc...)

thermal effects.

In certain media, particularly in the B.S.O. crystal, it is known that, in order to have high amplification, a phase shift must be produced between the reference wave and the index variation network, by moving for example the crystal or the interference strata.

Amplification is obtained by means of a reference wave $\Sigma_R$ and it results from the self-diffraction of this reference wave in the dynamic phase grating, induced in medium C.

The amplified wave front $\Sigma_2$ is identical to the incident wave front $\Sigma_1$, except for the amplification coefficient.

The incident wave $\Sigma_1$ and the reference wave $\Sigma_R$ are at the same optical frequency and the same goes for the amplified wave $\Sigma_2$.

It is demonstrated in the document already cited by J. P. Huignard and A. Marrakchi that under these conditions the intensity of the wave transmitted by the interaction medium can be written in the form:

$$I_2 = I_1 \frac{(1 + \beta) \exp(\Gamma - \alpha)}{\beta + \exp(\Gamma l)} \qquad (1)$$

where $\beta = I_R/I_1$
and $I_1$, $I_2$ and $I_R$ are respectively the intensities of the waves $\Sigma_1$, $\Sigma_2$ and the reference wave $\Sigma_R$, $l$ is the length of the crystal, $\alpha$ its absorption coefficient and $\Gamma$ the gain.

$\Gamma$ is given by the expression:

$$\Gamma = \frac{4\pi \Delta n_S}{\lambda \cos\psi} \qquad (2)$$

where $\Delta n_S$ is the variation at saturation and $\psi$ the angle between the waves $\Sigma_1$ and $\Sigma_R$.

If $\beta$ is very large, expression (1) can be simplified and becomes:

$$I_2 = I_1 \exp(\Gamma - \alpha) \qquad (3)$$

From the expression (1) we find the value $l_o$ of $l$, which gives the greatest amplification which is such that:

$$l_o = \log_e \beta(\Gamma/\alpha - 1) \qquad (4)$$

By way of example, we will take the following numerical values:
refraction index at saturation, $\Delta n_S = 10^{-4}$
absorption coefficient, $\alpha = 2$ $cm^{-1}$
angle between the wave fronts in the medium, $\cos\psi \simeq 1$
reference intensity ratio on signal $\uparrow = 10^9$
We find from (2) and (4)

Figure 2:
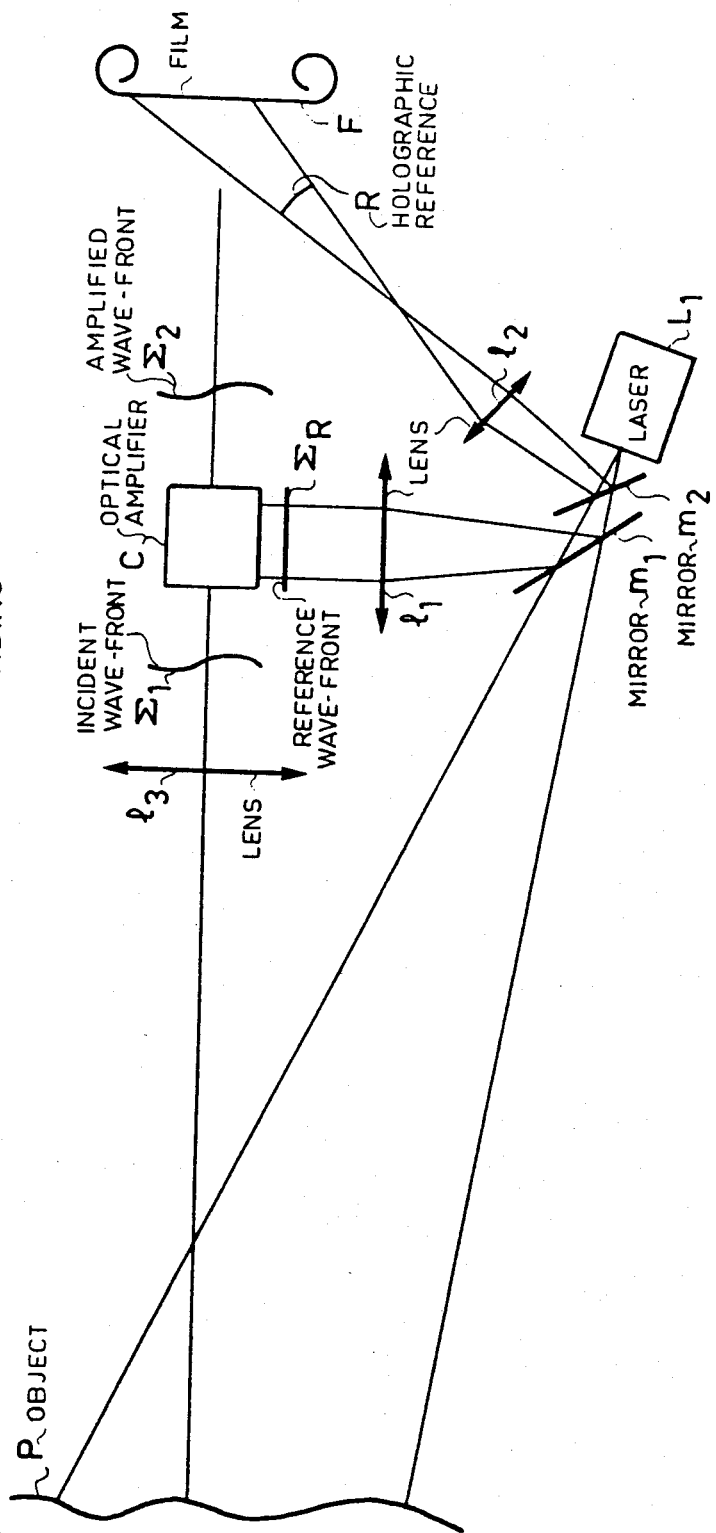
FIG. 2, the simplified diagram of recording successive holograms, in accordance with the invention.

$\Gamma = 12$ $cm^{-1}$ and $l_o = 10$ mm
from which according to (4)
$I_2/I_1 = 2 \times 10^4$ FIG. 2 shows the formation of a hologram of a scene P on a film F.

The light source is a laser $L_1$, which illuminates the scene to be recorded P through two semi-transparent mirrors $m_1$ and $m_2$.

The optical power taken by the semi-transparent mirror $m_1$ provides, by means of a lens $l_1$ the flat reference wave $\Sigma_R$ which illuminates the photorefractive medium C. Semitransparent mirror $m_2$ takes off the optical power required for obtaining, by means of lens $l_2$, the oblique reference spherical wave for the hologram on film F.

The light diffused by scene P falls on a lens $l_3$ providing the signal wave front $\Sigma_1$ incident on the photorefractive medium, which supplies by amplification the wave front $\Sigma_2$ which falls on the film.

The hologram on film F is then obtained by interference of the amplified wave $\Sigma_2$ and the holographic reference wave R, supplied by lens $l_2$.

Taking into account the amplification, the power of wave $\Sigma_2$ is such that the exposure time, for a laser $L_1$ supplying a power of the order of 1 watt, is sufficiently short to allow a film to be produced for the cinema.

Figure 3:
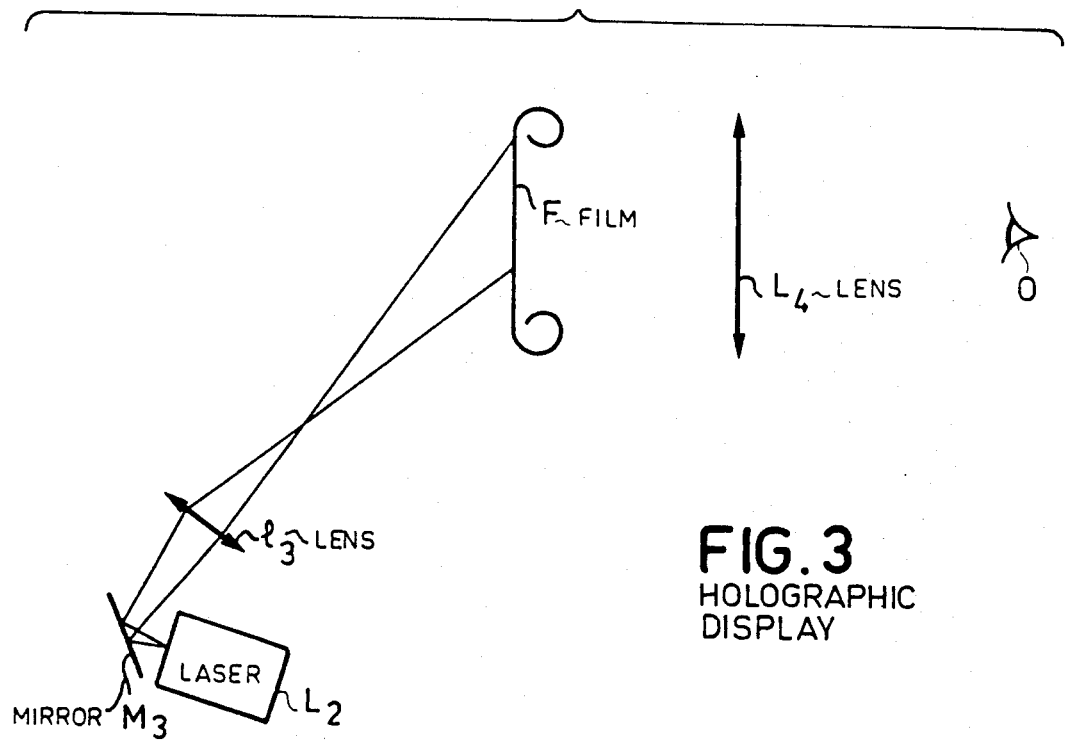
FIG. 3, the projection diagram of the holograms.

After development of the film F, the holograms may be projected, as shown in FIG. 3. A laser $L_2$ provides the spherical wave for lighting the recorded hologram, through mirror $m_3$ and lens $l_3$. A lens $l_4$ reflects the image practically to infinity. The image may thus be seen by a number of spectators.

In an example of application, we have:
Linear dimensions of the scene P to be filmed $\omega$ 3 m
Shooting distance = 10 m
Power of the recording laser $L_1 = 2$ W
Area of the amplifying medium = $1 \times 1$ cm$^2$
Length $l_o$ of the amplifying medium = 1 cm
Effective gain of the amplifying medium = $\Gamma - \alpha = 10$ cm$^{-1}$
Intensity of the incident signal $\Sigma_1$ on the amplifying medium — $I_1 = 5$ nW/cm$^2$
Intensity of the amplified wave $\Sigma_2$, $I_2 = 1000$ $\mu$W/cm$^2$
Area of the hologram = 1 cm$^2$
Exposure time of the hologram = 50 ms
Writing energy for the hologram = 5 $\mu$J.
Intensity of the reference wave R of the holograms = 1 mW.

The exposure time of 50 ms is sufficient for a film of high resolution, required in holography, and allows the necessary rate to be obtained for the cinema.

On the other hand, without amplification the exposure time under the same conditions would have been 200 sec, which does not allow this rate to be obtained.

According to a variation of the invention, color holographic movies are provided.

Figure 4:
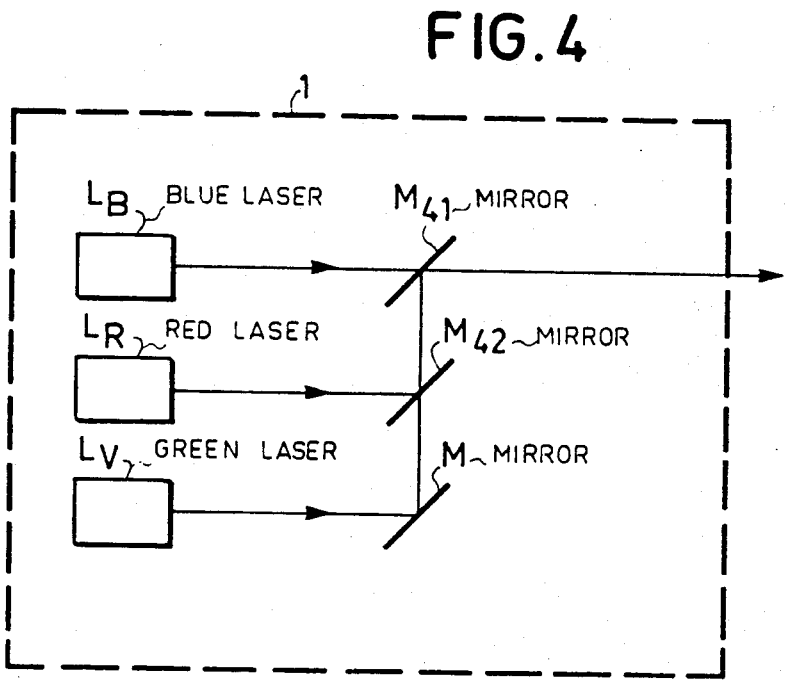
FIG. 4, the diagram for mounting the three color source for holographic movies in color.

For this, laser $L_1$ of FIG. 2 is replaced by an assembly 1, shown in FIG. 4, comprising a blue laser $L_B$, a green laser $L_V$ and a red laser $L_R$, as well as a mirror M and two dichroic mirrors $N_1$ and $N_2$. These mirrors allow the beam from the three lasers $L_B$, $L_V$ and $L_R$ to be superimposed. The same assembly 1 serves for projection.

Amplifying media such as B.S.O. may be used for the simultaneous amplification of the three wave fronts. In fact, the B.S.O. crystal is sensitive in the 450–650 nm range.

To conclude, a new device has been described for providing monochrome or trichrome movies in relief.

Obviously, numerous modifications and variations of the present invention are possible in light of the above teachings. It is therefore to be understood that within the scope of the appended claims, the invention may be practiced otherwise than as specifically described herein.

What is claimed is:

1. A holographic movie device for recording and projecting holographic movie images on film comprising: light source means for producing at least one laser light, said laser light source providing,
   (a) illumination of a scene,
   (b) a spherical reference wave incident to said film; and
   (c) a flat reference wave,
   and an induced photo refractive index medium positioned so as to be illuminated by said flat reference wave and wherein the wave diffused by said scene is incident on said medium, said medium providing an amplified wave front which is incident on said film.

2. The holographic movie device as claimed in claim 1, wherein said light source means comprises a laser which provides an oblique spherical wave incident on the developed film and wherein a lens is placed so as to be able to project the holographic image of the restored scene.

3. The holographic movie device as claimed in claim 1 or 2, wherein said light source means comprises three lasers whose beams are recombined to record and restore the holographic images.

4. The holographic movie device as claimed in claim 2, wherein the induced photorefractive index medium is $Bi_{12}SiO_{20}$ (B.S.O.).

5. The holographic movie device as claimed in claim 1, wherein the induced photorefractive index medium is a gas having saturated absorption.

6. The holographic movie device as claimed in claim 1, wherein the induced photo refractive index medium is a semiconductor medium.

* * * * *